(12) United States Patent
Kosonen et al.

(10) Patent No.: US 10,097,778 B2
(45) Date of Patent: Oct. 9, 2018

(54) IMAGE SENSOR AND METHOD FOR IMPROVING READOUT SPEED

(71) Applicants: Rayence Co., Ltd., Gyeonggi-do (KR); Vatech Ewoo Holdings Co., Ltd., Gyeonggi-do (KR)

(72) Inventors: Jari Pekka Kosonen, Gyeonggi-do (KR); Sung Kyn Heo, Gyeonggi-do (KR)

(73) Assignees: Rayence Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/895,489

(22) PCT Filed: Apr. 29, 2014

(86) PCT No.: PCT/KR2014/003778
§ 371 (c)(1),
(2) Date: Dec. 2, 2015

(87) PCT Pub. No.: WO2014/178607
PCT Pub. Date: Nov. 6, 2014

(65) Prior Publication Data
US 2016/0134822 A1 May 12, 2016

(30) Foreign Application Priority Data
May 2, 2013 (KR) .................. 10-2013-0049429

(51) Int. Cl.
*H04N 5/374* (2011.01)
*H04N 5/347* (2011.01)
(Continued)

(52) U.S. Cl.
CPC ............. *H04N 5/374* (2013.01); *H04N 5/347* (2013.01); *H04N 5/378* (2013.01); *H04N 5/32* (2013.01)

(58) Field of Classification Search
CPC ........ H04N 5/374; H04N 5/347; H04N 5/378; H04N 5/32
See application file for complete search history.

(56) References Cited

U.S. PATENT DOCUMENTS

| 5,949,483 A * | 9/1999 | Fossum | ................ G11C 19/282 |
| | | | 250/208.1 |
| 7,154,075 B2 * | 12/2006 | Krymski | ................ H04N 5/347 |
| | | | 250/208.1 |

(Continued)

FOREIGN PATENT DOCUMENTS

| KR | 10-2011-0059491 A | 6/2011 |
| KR | 10-2012-0004690 A | 1/2012 |

(Continued)

OTHER PUBLICATIONS

Korea Intellectual Property Office, International Search Report of International application No. PCT/KR2014/003778, dated Aug. 5, 2014.

(Continued)

*Primary Examiner* — Nicholas G Giles
(74) *Attorney, Agent, or Firm* — IP Legal Services, LLC

(57) ABSTRACT

The present invention provides an image sensor comprising: pixels arranged along a plurality of row lines and column lines in a matrix form; a scan driving unit for selecting the row lines in the unit of n lines in a binning mode; and a read circuit unit for outputting n*m binning signals generated by sampling n*1 signals output in every column line according to the selection of the row lines and averaging the sampled n*1 signals in the unit of m neighboring column lines, (Continued)

wherein each of n and m is a natural number larger than or equal to 2.

9 Claims, 4 Drawing Sheets

(51) Int. Cl.
*H04N 5/378* (2011.01)
*H04N 5/32* (2006.01)

(56) References Cited

U.S. PATENT DOCUMENTS

| | | | | |
|---|---|---|---|---|
| 7,319,218 | B2 * | 1/2008 | Krymski | H04N 5/347 250/208.1 |
| 7,479,994 | B2 * | 1/2009 | Yang | H04N 3/1562 348/241 |
| 7,515,183 | B2 * | 4/2009 | Yang | H04N 9/045 348/241 |
| 7,548,261 | B2 * | 6/2009 | Yang | H04N 9/045 348/241 |
| 7,982,789 | B2 * | 7/2011 | Watanabe | H04N 9/045 348/272 |
| RE44,765 | E * | 2/2014 | Yang | H04N 3/1562 348/222.1 |
| 2003/0030737 | A1 * | 2/2003 | Yanai | H04N 3/1562 348/296 |
| 2005/0103977 | A1 * | 5/2005 | Krymski | H04N 5/347 250/208.1 |
| 2007/0063128 | A1 * | 3/2007 | Krymski | H04N 5/347 250/208.1 |
| 2012/0006972 | A1 | 1/2012 | Yoo | |
| 2012/0268633 | A1 | 10/2012 | Sambonsugi | |
| 2013/0082164 | A1 | 4/2013 | Oh et al. | |
| 2013/0284892 | A1 | 10/2013 | Kyushima et al. | |
| 2013/0284893 | A1 | 10/2013 | Kyushima et al. | |

FOREIGN PATENT DOCUMENTS

| | | |
|---|---|---|
| KR | 10-2012-0045811 A | 5/2012 |
| KR | 10-2013-0036563 A | 4/2013 |
| WO | 2012/098777 A1 | 7/2012 |
| WO | 2012/098778 A1 | 7/2012 |

OTHER PUBLICATIONS

Korea Intellectual Property Office, Written Opinion of the International Searching Authority for International application No. PCT/KR2014/003778, dated Aug. 5, 2014.

European Patent Office, Supplementary European Search Report Reason of EP Application No. 14 792 186.0, dated Nov. 6, 2016.

European Patent Office, Supplementary European Search Report of EP Application No. 14 792 186.0, dated Nov. 6, 2016.

* cited by examiner

IMAGE SENSOR AND METHOD FOR IMPROVING READOUT SPEED

CROSS REFERENCE TO RELATED APPLICATIONS

This application is a National Stage Patent Application of PCT International Patent Application No. PCT/KR2014/003778 (filed on Apr. 29, 2014) under 35 U.S.C. § 371, which claims priority to Korean Patent Application No. 10-2013-0049429 (filed on May 2, 2013), the teachings of which are incorporated herein in their entireties by reference.

BACKGROUND OF THE INVENTION

Field of the Invention

The present invention relates to an image sensor, and more particularly, to an image sensor and a method for driving the same capable of improving a readout speed in a binning mode.

Description of the Related Art

An image sensor is a device for detecting optical image signals from the outside and converting the optical image signals into electric signals and has been widely used by being installed in various electronic equipments.

The image sensor has light detecting elements, i.e., pixels arranged along row lines and column lines in a matrix form, and each pixel includes a photodiode for converting incident lights into electrical signals.

A pixel of the image sensor has a small size, and there is a limit to the amount of light which the photodiode can receive. To improve this, the image sensor driven in binning mode has been used.

In a normal mode, an image is formed by using the electric signals generated in each pixel, but in the binning mode, an image is formed by summing electrical signals of neighboring pixels.

According to the conventional art, even in the binning mode, the row lines and the column lines are selected one by one in reading out the signals similarly to the normal mode. Thus, the readout speed in the binning mode is reduced, and the quality of the binned images is degraded because the signal-to-noise ratio is reduced.

Further, it is not easy to increase the frame rate with the conventional art because the signals of the odd-numbered row lines and the even-numbered row lines are read out in the opposite phase to each other so that the time delay is generated between the row lines.

SUMMARY OF THE INVENTION

It is an object of the present invention to increase the signal-to-noise ratio and the frame rate by raising the readout speed in the binning mode.

In order to achieve the above object, according to one aspect of the present invention, there is provided an image sensor, including: a plurality of pixels arranged in a matrix from along a plurality of row lines and column lines; a scan driver configured to select the row lines with n number line basis in a binning mode; and a readout circuit configured to read n×1 signals from each of the column lines in response to the selection of the row lines, to sample the n×1 signals, to average the n×1 signals with a m number of column line basis, and to output n×m binning signals, wherein n and m are natural numbers of 2 or more.

The readout circuit may include first sampling circuits and second sampling circuits configured to sample, by turns, the n×1 signal output from each of the column lines, and to output, by turns, the n×m binning signals; and connecting switches configured to turn on/off respective connections of m number of the first sampling circuits and the second sampling circuits.

Each of the first sampling circuits and the second sampling circuits may include a first switch configured to turn on/off input of the n×1 signal; a capacitor configured to store the n×1 signal and to store the n×m signal when the connecting switch is in a turns on state; and a second switch configured to turn on/off output of n×m signals.

The readout circuit is configured to sequentially output the n×m signals with the m number of column line basis.

According to another aspect of the present invention, there is provided a method of driving an image sensor including a plurality of pixels arranged in a matrix from along a plurality of row lines and column lines, including: selecting the row lines with n number line basis in a binning mode; and sampling n×1 signals from each of the column lines in response to the selection of the row lines, and outputting n×m binning signals by averaging the n×1 signals with a m number of column line basis with a readout circuit wherein n and m are natural numbers of 2 or more.

The method further includes: sampling, by turns, the n×1 signal output from each of the column lines, and outputting, by turns, the n×m binning signals with first sampling circuits and second sampling circuits configured of the readout circuit, wherein the n×m binning signals are formed by connecting m number of the first sampling circuits and the second sampling circuits.

Each of the first sampling circuits and the second sampling circuits includes: a first switch configured to turn on/off input of the n×1 signal; a capacitor configured to store the n×1 signal and to store the n×m signal when the connecting switch is in a turn-on state; and a second switch configured to turn on/off output of n×m signals.

The readout circuit is configured to sequentially output the n×m signals with the m number of column line basis.

According to further another aspect of the present invention, there is provided an image sensor, including: a plurality of pixels arranged in a matrix from along a plurality of row lines and column lines; a plurality of scan lines extended from the row lines; a plurality of readout lines extended from the column lines; a scan driver connected to the scan lines and configured to select the row lines with n number line basis in a binning mode or to select the row lines with one line basis in a normal mode; and a readout circuit connected to the readout lines and configured to read n×1 signals from each of the readout lines, to sample the n×1 signals, to average the n×1 signals with a m number of column line basis, and to output n×m binning signals, in the binning mode or to sample and output signals from each of the readout lines sequentially in the normal mode, wherein the readout circuit includes: first sampling circuits and second sampling circuits coupled in parallel and configured to sample, by turns, the n×1 signal output from each of the column lines, and to output, by turns, the n×m binning signals in the binning mode; and connecting switches configured to turn on/off respective connections of m number of the first sampling circuits and the second sampling circuits in accordance with averaging control signals, wherein each of the first sampling circuits and the second sampling circuits includes a first switch configured to turn on/off input of the n×1 signal according to sampling control signals, a metal oxide semiconductor (MOS) capacitor configured to store the n×1 signal and to store the n×m signal when the connecting switch is in a turn-on state, and a second switch configured to turn on/off output of n×m signals, wherein while one of the first and second sampling circuits performs the sampling operation, the other performs the output operation of the 2×2 binning signal, and wherein n and m are natural numbers of 2 or more.

According to still further another aspect of the present invention, there is provided a method of driving an image sensor including a plurality of pixels arranged in a matrix from along a plurality of row lines and column lines, a plurality of scan lines extended from the row lines, and a plurality of readout lines extended from the column lines, including: selecting the scan lines with n number line basis in a binning mode or selecting the scan lines with one line basis in a normal mode; and sampling the n×1 signal output from each of the column lines through the readout line, by turns, with first sampling circuits and second sampling circuits of the readout circuit in the binning mode or sampling signals from each of the column lines in the normal mode, outputting n×m binning signals by averaging the n×1 signals with a m number of column line basis in the binning mode or outputting signals from each of the column lines in the normal mode, wherein the n×m binning signals are formed by connecting m number of the first sampling circuits and the second sampling circuits, while one of the first and second sampling circuits samples the n×1 signals, the other of the first and second sampling circuits outputs the 2×2 binning signal, and wherein n and m are natural numbers of 2 or more.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
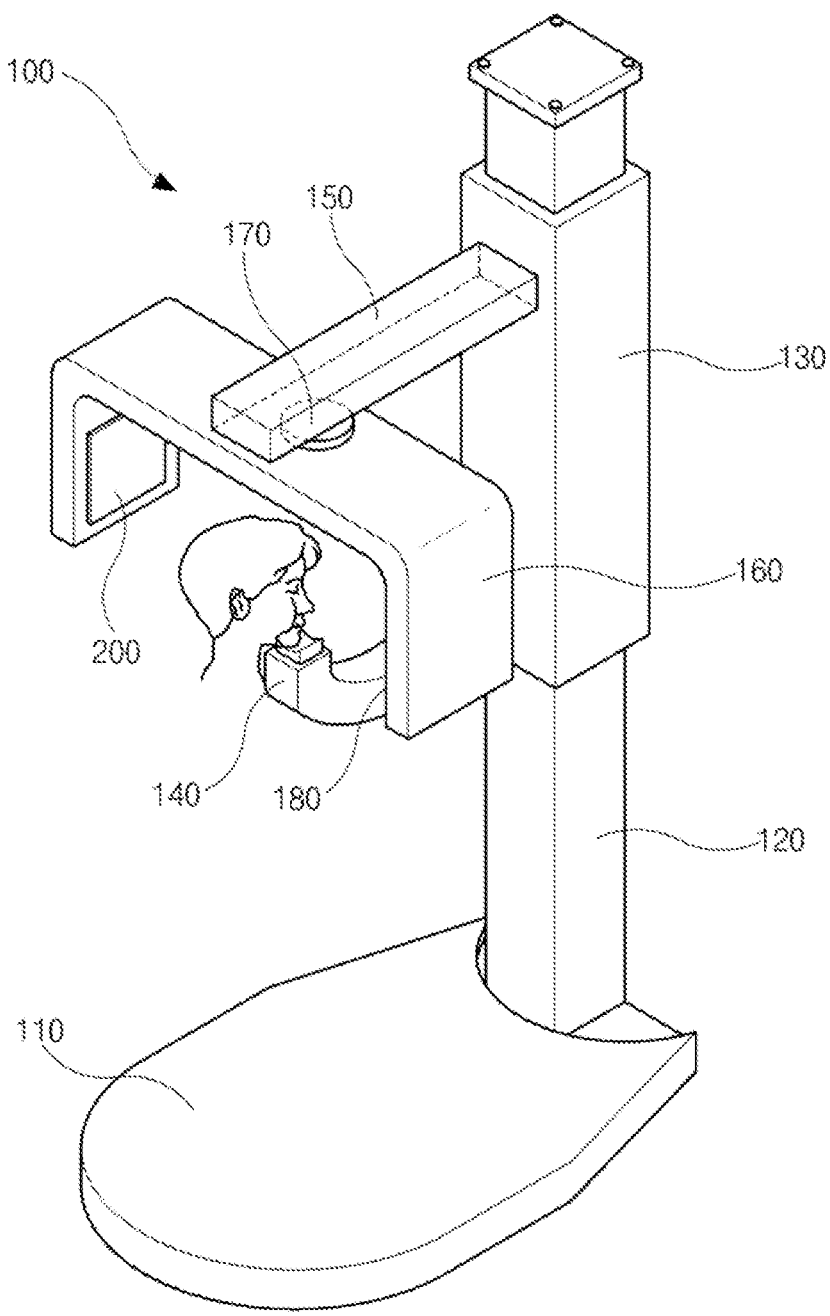
FIG. 1 is a perspective view schematically showing an imaging system in accordance with an embodiment of the present invention.

Hereinafter, referring to the drawings, embodiments of the present invention will be described in detail.

Figure 2:
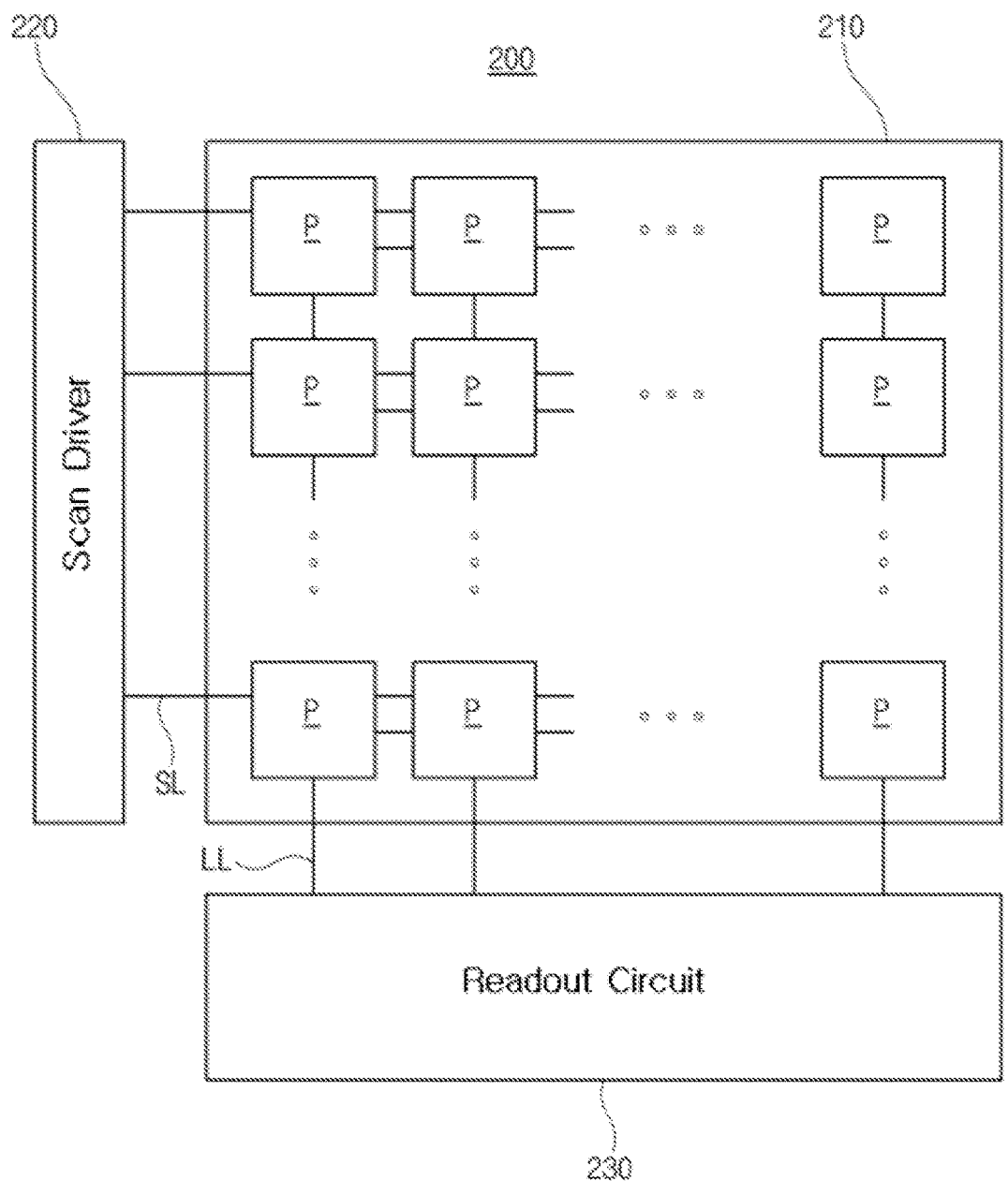
FIG. 2 is a schematic block diagram illustrating an image sensor in accordance with an embodiment of the present invention.
Figure 3:
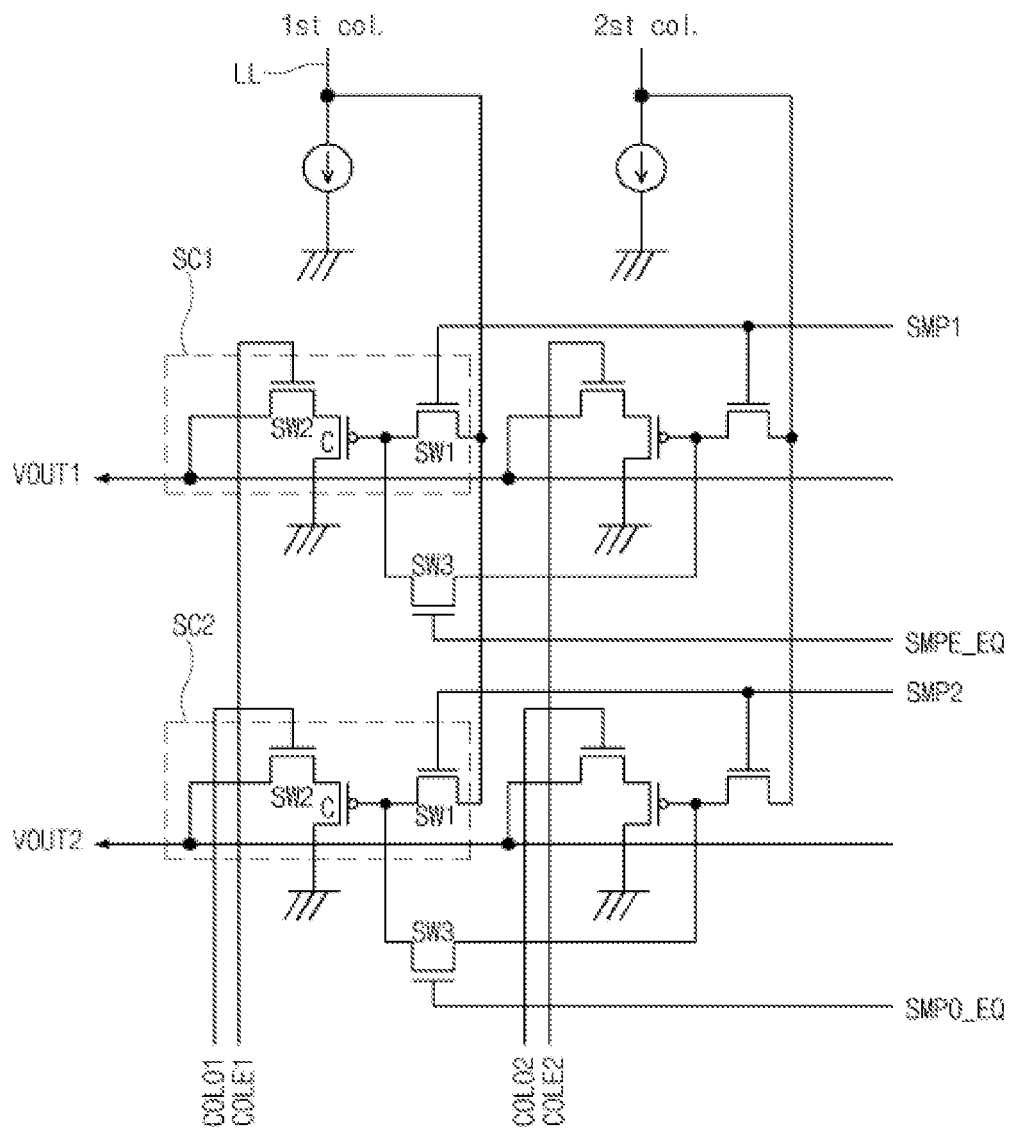
FIG. 3 is a circuit diagram schematically illustrating a readout circuit part of the image sensor in accordance with an embodiment of the present invention.

FIG. 1 is a perspective view schematically showing an imaging system including the image sensor in accordance with an embodiment of the present invention, FIG. 2 is a schematic block diagram of the image sensor in accordance with an embodiment of the present invention, and FIG. 3 is a schematic circuit diagram of a readout part of the image sensor in accordance with an embodiment of the present invention.

As the imaging system 100 adopting an image sensor 200 in accordance with an embodiment of the present invention, various types or applications of imaging systems may be used. For example, an X-ray imaging system such as a mammography system, a computed tomography (CT) system or the like may be used as a medical imaging system. For convenience of description, a dental X-ray imaging system is to give an example of an X-ray imaging system.

Referring to FIG. 1, the imaging system 100 according to an embodiment of the present invention includes a base 110, a supporting column 120, a lifting member 130, a chin supporting member 140, a rotary arm supporting member 150, a rotary arm 160, a rotary arm driving means 170, an X-ray generator 180 and the image sensor 200.

The base 110 is placed on the floor to support the support column 120 where the above-described components are. The support column 120 is connected to the base 110 and extends vertically from the base 110 to have an established state.

The lifting member 130 is installed on the support column 120, thereby has a vertical movement up and down along the support column 120 with a driving means such as a motor. Through this operation, it is possible to adjust the height of the chin support member 140 according to the height of the patient to be examined.

The chin support member 140 is provided on the lifting member 130 to support the chin of the patient. With this chin support member 140, the head of the patient, i.e., a subject, is able to be positioned between the X-ray generator 180 and the image sensor 200. The rotary arm supporting member 150 is connected to an upper portion of the lifting member 130 and extends along a direction parallel to the floor.

The rotary arm 160 is connected to a lower portion of the rotary arm supporting member 150. The rotary arm 160 connected in this way is able to make a horizontal movement along the direction parallel to the floor or a rotary motion relative to a rotation axis perpendicular to the floor by the rotary arm driving means 170. The rotary arm 160 may include a horizontal part connected to the rotary arm supporting member 150 and vertical parts bent downward from both ends of the horizontal part.

The X-ray generator 180 and the image sensor 200 may be respectively installed and disposed within the vertical parts at both sides of the rotary arm 160 so as to face each other. The X-ray generator 180 may be configured to generate and irradiate the X-rays to the subject, and the X-rays passing through the subject are incident on the image sensor 200.

The image sensor 200 is configured to detect the X-rays passing through the subject and to convert the X-rays to the corresponding electrical signals. The image sensor 200 may have a rectangular shape in plan, but the shape of the image sensor 200 is not limited to this.

As the image sensor 200 in accordance with an embodiment, a direct type image sensor which converts the X-rays directly to the electrical signals or an indirect type image sensor which converts the visible rays into the electric signals after converting the X-rays into the visible rays may be adopted.

In case of adopting the indirect type image sensor, the image sensor is configured to include a layer of scintillator (scintillating layer) that converts X-rays into the visible rays. In such a case, the scintillating layer may be formed of CsI (cesium iodide), but the scintillating layer is not limited to this.

The image sensor 200 may be a contemporary metal oxide semiconductor (CMOS) type image sensor, but the type of the image sensor is not limited to this.

Referring to FIG. 2, the image sensor 200 may include an array 210 where pixels, i.e., elements for converting the incident light into the electrical signals, are arranged in a matrix form along the row line and the column line and a driving circuit.

The pixel P may include a photodiode, thereby converting the incident light into the electric signals.^^

The driving circuit may include a scan driver 220 and a read circuit 230.

The scan driver 220 may sequentially select the row lines through scan lines SL. If a row line is selected, the electric signals of the pixels P which are located on the selected row line are read out via readout line s LL that extend along the corresponding column line.

The scan driver 220 may control the number of the row lines selected in accordance with driving modes. For example, in a normal mode, the row lines may be sequentially selected one by one, with a set of one row line. In the binning mode, the row lines may be sequentially selected at least two by two, with a set of at least two row lines. In the binning mode in accordance with the embodiment of the present invention, for convenience of explanation, the case of selecting the row lines with the set of the two row lines is explained as an example.

Referring to FIG. 3, the readout circuit 230 may include a first sampling circuit and a second sampling circuit SC1, SC2 connected in parallel with each other at the end of each readout line LL.

The first and the second sampling circuits SC1, SC2 may be formed to have the same circuit configuration. For example, each of first and second sampling circuits SC1, SC2 may include a first switch and a second switch SW1, SW2 and a capacitor between the first and second switches SW1, SW2.

The first switch S1 may be connected to the corresponding readout line LL and the operation of turn-on/turn-off is controlled by the corresponding sampling control signals SMP1, SMP2. When the first switch SW1 is turned on, the electrical signals passed through the readout line LL is able to be sampled in the sampling circuit.

The capacitor C may include a first electrode connected to the first switch SW1 and may store electrical signals delivered by the turn-on operation of the first switch SW1. As the capacitor C, for example, a metal oxide (MOS transistor) capacitor may be used, but the type of the capacitor is not limited to this.

The second switch SW2 is connected to a second electrode of the capacitor C, and the turn-on/turn-off operation is controlled in accordance with the corresponding output control signals COLE, COLO. When the second switch SW2 is turned on, the electrical signals stored in the capacitor C are able to be output.

A connecting switch SW3 may be provided between neighboring first sampling circuits SC1 to control electrical connection of the first sampling circuits. For example, the connecting switch SW3 may be configured to control turn-on/turn-off the connection between the capacitors C of a plurality of the first sampling circuits SC1. Similarly, the connecting switch SW3 may also be provided between the neighboring second sampling circuits SC2 to control the electrical connection of the neighboring second sampling circuits. According to an embodiment of the present invention, for convenience of explanation, the connecting switch SW3 is configured to control on/off the electrical connection, for example, between the two sampling circuits in a set.

The turn-on/turn-off operation of the connecting switch SW3 is controlled in accordance with corresponding control averaging signals SMPE_EQ, SMPO_EQ. When the connecting switch SW3 is turned on, the sampling circuits connected to the switch 3 are electrically connected to each other and the electric signals sampled by the sampling circuits are averaged.

The read out circuit 230 having the configuration as described above, drives the first and second sampling circuits SC1, SC2 by turns to perform the signal sampling and the output. In particular, in the binning mode, the electric signals are averaged by electrically connecting the sampling circuits adjacent each other, and this will be described in more detail with reference FIG. 4.

Figure 4:
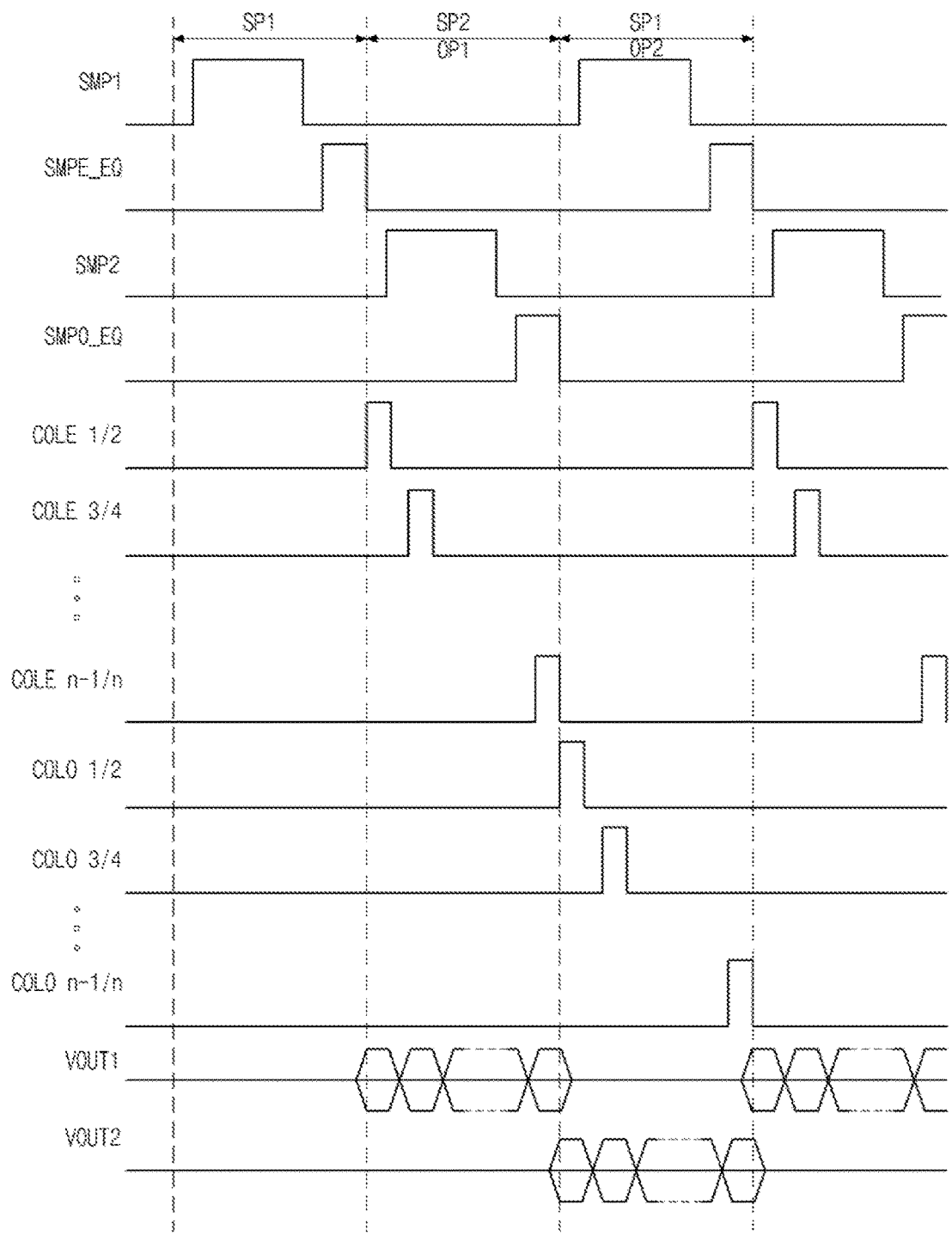
FIG. 4 is a view showing the waveform of the relevant signals at the binning mode of the image sensor in accordance with an embodiment of the present invention.

FIG. 4 shows waveforms of relevant signals in the binning mode of the image sensor in accordance an embodiment of the present invention.

The scan driver 220 may select, for example, the first and the second row lines. The electrical signals, i.e., 2×1 signals of the pixels located at the first and the second row lines are output to the respective readout line s LL. Namely, the electric signals of the pixels located at the first and second row lines of each column line are output together to the readout line LL and averaged so that the 2×1 binning is performed. The 2×1 binning signals generated in this way are transmitted to the read out circuit 230 via the readout line LL.

Next, the first sampling circuit SC1 samples the 2×1 binning signals transmitted through the readout line LL for a first sampling period SP1.

For this, a first sampling control signal SMP1 having a high level as a turn-on level is generated and simultaneously applied to all of the first sampling circuits SC1 for first the sampling period SP1. Accordingly, the first switch SW1 of the first sampling circuit SC1 is turned on, and the 2×1 binning signal is transmitted and stored in the corresponding capacitor C of the first sampling circuit SC1.

Thereafter, if the first switch SW1 is changed from the turn-on state to the turn-off state, the first averaging control signal SMPE_EQ having a high level as a turn-on level is generated and applied to the connecting switch S3 connected to the first sampling circuit SC1. Accordingly, the connecting switch S3 is turned on, and the capacitors C of the two neighboring first sampling circuits SC1 are electrically connected to each other. Thus, 2×1 binning signals stored in the first sampling circuit SC1 are averaged and the 2×2 binning is performed. The 2×2 binning signal generated like this is stored in each capacitor C.

Next, for a first output OP1 after the first sampling period SP1, the first output control signals COLE are sequentially applied by the two column lines in a set. Thus, the second switches SW2 are sequentially turned ON the two column lines in the set, the 2×2 binning signals stored in the first sampling circuit SC1 are sequentially output.

For example, the 2×2 binning signal of the first and second column lines→the 2×2 binning signal of the third and fourth column lines→ . . . →the 2×2 binning signal of N−1$^{th}$ and n$^{th}$ column lines are output in this order.

After the sampling process is performed to the first and the second law lines for the first sampling period SP1 as described above, another sampling process is performed to the third and the fourth raw lines for the second sampling period SP2.

The sampling process performed for the second sampling period SP2 with the use of the second sampling circuit SC2 is substantially same with the above-mentioned sampling process performed for the first sampling period SP1 with the use of the first sampling circuit SC1.

In other words, in each column line, the 2×1 binning signal for the third and fourth row lines is sampled at the corresponding second sampling circuit SC2, and the 2×2 binning signal are stored after the signal averaging.

The 2×2 binning signals stored in the second sampling circuit SC2 as described above, are sequentially output to the two column lines, set by set, in a second output period OP2 after the second sampling period SP2.

The 2×1 binning signals, sequentially output by selecting two law lines as described above, are sampled, by turns, with the first and second sampling circuits SC1, SC2. While one of the first and second sampling circuits SC1, SC2 performs the sampling operation, the other performs the output operation of the 2×2 binning signal.

In the case of driving the image sensor 200 in the normal mode, electric signals of each pixel are output for the respective column line by selecting the row lines sequentially.

In such a case, one of the first and second sampling circuits SC1, SC2 is activated to perform the sampling and outputting, and the other sampling circuit may not be used by disabled. As another example, similar to the binning mode, the first and second sampling circuits SC1, SC2 may be used alternately to perform sampling and output.

And, in the normal mode, the connecting switch SW3 is placed at the off state since the signal averaging is not required with the read out circuit 230.

As described above, according to the embodiment of the present invention, in the binning mode, the n×1 binning is performed by selecting n number of the law lines in a set, and then N×1 binning averaging is performed by m number of column lines in a set to carry out n×m binning. Furthermore, by using a plurality of the sampling circuits for each column line in side-by-side configurations, it is possible to perform the signal sampling, the averaging, and the outputting by turns.

Accordingly, it is possible in the binning mode, the signal read speed may be increased, thereby the signal-to-noise ratio is improved and the frame rate can be increased.

What is claimed is:

1. An image sensor, comprising:
a plurality of pixels arranged in a matrix form along a plurality of x row lines and m column lines, wherein the x and the m are integer numbers equal to or greater than 1;
a scan driver configured to sequentially select the row lines, wherein the scan driver is configured to simultaneously select n row lines at each selection sequence in a binning mode, wherein the n is an integer number equal to or greater than 2; and
a readout circuit configured to, at each selection sequence in the binning mode, simultaneously read n signals from pixels arranged at the selected n row lines and each one of the m column lines, to generate sampled signals of each column line by sampling the n signals of one column line, to average the sampled n signals of the m column lines, and to output the averaged signals as binning signals, the readout circuit further including first sampling circuits and second sampling circuits, wherein either one of the first sampling circuits and the second sampling circuits sample the n signals output from each of the m column lines, while the other one of the first sampling circuits and second sampling circuits output the binning signals.

2. The image sensor of claim 1, wherein the readout circuit includes:
connecting switches configured to turn on/off respective connections of m number of the first sampling circuits and the second sampling circuits.

3. The image sensor of claim 2, wherein each of the first sampling circuits and the second sampling circuits includes:
a first switch configured to turn on/off input of the n signals;
a capacitor configured to store the n signals and to store the binning signals when the connecting switch is in turns on state; and
a second switch configured to turn on/off output of the binning signals.

4. The image sensor of claim 1, wherein the readout circuit is configured to sequentially output the binning signals with the m number of column line basis.

5. A method of driving an image sensor including a plurality of pixels arranged in a matrix form along a plurality of x row lines and m column lines, wherein the x and the m are integer numbers equal to or greater than 1, comprising:
sequentially selecting the row lines by simultaneously selecting n row lines at each selection sequence in a binning mode, wherein the n is an integer number equal to or greater than 2; and
at each selection sequence in the binning mode, simultaneously reading n signals from pixels arranged at the selected n row lines and each one of the m column lines, sampling the read_n signals from each of the m column lines, and outputting binning signals by averaging the n signals of the m column lines with a readout circuit,
wherein the sampling the read n signals and the outputting binning signals comprises:
sampling by either one of first sampling circuits and second sampling circuits the n signals output from each of the m column lines, while the other one of the first sampling circuits and second sampling circuits output the binning signals.

6. The method of claim 5, further comprising:
sampling, by turns, the n signals output from each of the m column lines, and outputting, by turns, the binning signals with first sampling circuits and second sampling circuits included in-the readout circuit,
wherein the binning signals are formed by connecting m number of the first sampling circuits and the second sampling circuits.

7. The method of claim 6, wherein each of the first sampling circuits and the second sampling circuits includes:
a first switch configured to turn on/off input of the n signals;
a capacitor configured to store the n signals and to store the binning_signals when the connecting switch is in a turn-on state; and
a second switch configured to turn on/off output of the binning signals.

8. The method of claim 5, wherein the readout circuit is configured to sequentially output the binning signals of the m number of column lines.

9. An image sensor, comprising:
a plurality of pixels arranged in a matrix form along a plurality of x row lines and m column lines, wherein the x and the m are integer numbers equal to or greater than 1;
a plurality of scan lines respectfully extended from the x row lines;
a plurality of readout lines respectfully extended from the m column lines;
a scan driver connected to the scan lines and configured to sequentially select the row lines, wherein the scan driver is configured to simultaneously select n row lines at each selection sequence in a binning mode or to select one row line at each selection sequence in a normal mode; and a readout circuit connected to the readout lines and configured to, in the binning mode, simultaneously read n signals from each of the readout lines at each selection sequence, to sample the n signals, to average the n signals of the m column lines, and to output binning signals, or, in the normal mode, to sample and output signals from each of the readout lines sequentially, wherein the readout circuit includes:

first sampling circuits and second sampling circuits coupled in parallel and wherein either one of the first sampling circuits and the second sampling circuits sample the n signals output from each of the m column lines, while the other one of the first sampling circuits and second sampling circuits output the binning signals; and connecting switches configured to turn on/off respective connections of m number of the first sampling circuits and the second sampling circuits in accordance with averaging control signals, wherein each of the first sampling circuits and the second sampling circuits includes a first switch configured to turn on/off input of the n signals according to sampling control signals, a metal oxide semiconductor (MOS) capacitor configured to store the n signals and to store the binning signals when the connecting switch is in a turn-on state, and a second switch configured to turn on/off output of binning signals.

* * * * *